UNITED STATES PATENT OFFICE.

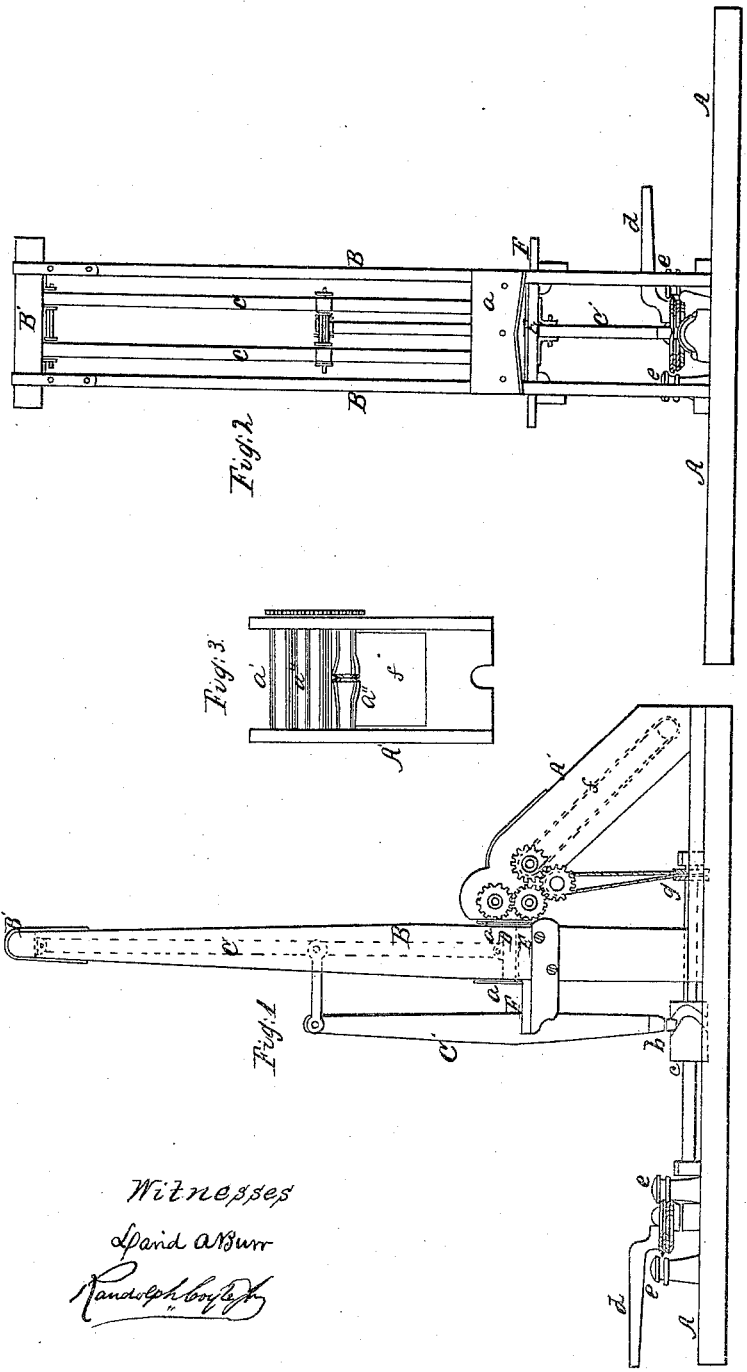

CHARLES S. STEVENS AND ALONZO T. BOON, OF GALESBURG, ILLINOIS.

IMPROVEMENT IN HAY-PRESSES.

Specification forming part of Letters Patent No. 44,673, dated October 11, 1864.

*To all whom it may concern:*

Be it known that we, CHARLES S. STEVENS and ALONZO T. BOON, of the city of Galesburg, in the county of Knox and State of Illinois, have invented a new and useful Improvement in Hay-Presses; and we do hereby declare that the following is a full, clear, and exact description of the construction and operation of the same, reference being had to the annexed drawings, making a part of this specification, of which—

Figure 1 is a side elevation of our improved press; Fig. 2, a back view of same, showing the endless carrier-stand, as represented in Figs. 1 and 3, removed; Fig. 3, a front view of the endless carrier-stand, the side view of it being represented in Fig. 1.

Like letters indicate like parts in all figures of the drawings.

The nature of our improvements has reference to a preliminary mode by which a small amount or quantity of hay is compressed in a simple, rapid, and effective manner, each flake or quantity thus compressed being transferred to the press-box, and when a sufficient amount or number of them have been had the final pressure is given to the whole. It is obvious that where a large quantity is compressed, as in the ordinary way, the elasticity of the hay in the center is such as to prevent its being rendered very compact; but by intermediate pressure given to a small amount or quantity at a time, and the whole finally compressed in the box, it will be apparent that in the bales thus formed there will be more compactness and closeness throughout the same than heretofore, thus obtaining an increased amount of hay in the ordinary-size bale, and at the same time obviating, to a great extent, the labor required in the compression of a large quantity at one time, each amount or quantity being so rapidly compressed as to keep one or more persons continually transferring them to the box where but a slight pressure is required to have the same ready for baling.

To enable others skilled in the art to make and use our invention, we will proceed to describe its construction and operation.

We have a base, A, on which stand two longitudinal uprights, B B, at a proper distance apart, and framed at the top by the transverse piece B', to which is swung or suspended two toggle-jointed levers C C. Attached to them is the follower or compressor D, as seen in dotted lines in Fig. 1, and shown down on the base-plate E. On each side of the follower is a sliding metallic plate, *a a*, which serves as a guide in keeping in its proper place, and at the same time the one on the back side of the uprights between them and the carrier-stand A having a knife-edge, as seen more clearly in Fig. 2, and which is represented as up to its fullest extent ready to descend, cuts or cleans off the flakes formed by the compression, the advancing sheet of hay from the endless carrier-cloth *f* shoving them from under the follower out onto the platform F, which is between the oscillating lever C' and the uprights, and from thence transferred to the press-box, and so on alternately. The follower or compressor is operated by an oscillating lever, C', above mentioned, the upper end of which is connected to the toggle-jointed levers by a suitable plate or brass bars embracing them, and is then pivoted to the platform, being let in a little from the edge of same. On the lower end of it is a friction-roller, *b*, which is introduced into a slotted cam on the drum-wheel *c*, the spiral form of the slot around the wheel being such as to give the proper ascending and descending motion to the follower, which may be more or less rapid, as occasion may require. The power is applied to the lever *d*, which is securely fastened to a horizontal beveled cog-wheel, which is connected by a similar one on the end of the driving-shaft on which is the slotted cam-wheel, as seen in Fig. 1. The horizontal cog-wheel is kept steady on its axis by a cone-edged plate on the top fitting into grooved friction-wheels *e e e* on three cylindrical posts suitably arranged around it.

The carrier-stand A' is composed of two side pieces, between which are two compression-rollers, *a' a'*, and underneath them the pulley or band-roller *a''*, as seen in Fig. 3, which roller, by means of its connection with the pulley-wheel *g*, near the end of the driving-shaft, by a band, operates the compression-rollers above and endless carrier-cloth (the latter of which is seen in dotted lines in Fig. 1) by means of cog-wheels suitably arranged in relation to one another on the outside of one of the side pieces. The slope or inclination of the side pieces from the uprights whose edges they stand against resting on legs properly secured thereto in a working machine would extend much farther out from the base than what is represented in the drawings, to receive the hay properly and prevent its slipping off. The hay is pitched onto the carrier-cloth tolerably even to the thickness of about eighteen inches, is then carried to and under the rollers, where it is compressed to about six inches; thence to and under the "follower," where it is compressed about one and one-half inch; and at the same time the knife-edge plate, as herein described, cuts the "flake" or "quantity" thus pressed clean from the advancing sheet of hay, the advancing sheet shoving the flake out on the platform. The said platform will be about six feet between the uprights and oscillating lever. A man standing on this platform (especially for the purpose) takes up the flake thus pushed out, turns it half around, and then lays it into or on a table in one of the press-boxes, the top of the boxes being about three feet above the platform. The table or follower in boxes will gradually descend as the box is filled. When about five hundred pounds is laid in, the man will turn and fill the others, and so on alternately.

We calculate that our improved press worked with seven men will bale twenty tons per day.

Having thus described our invention, what we claim, and desire to secure by Letters Patent, is—

1. The combination of the endless carrier-cloth $f$, compression-rollers $a'$ $a'$, and band-roller $a''$, with the metallic knife-edge plate $a$, substantially in the manner and for the purpose herein set forth.

2. The swing-lever $C'$ and slotted cam-wheel $c$, in combination with the toggle-jointed levers C C and follower D, substantially in the manner and for the purpose herein set forth.

C. L. STEVENS.
      ALONZO T. BOON.

Witnesses:
 WALTER HOOK,
 ASA A. MATTISON.